United States Patent

Martinez et al.

(10) Patent No.: US 7,809,926 B2
(45) Date of Patent: Oct. 5, 2010

(54) SYSTEMS AND METHODS FOR RECONFIGURING ON-CHIP MULTIPROCESSORS

(75) Inventors: Jose F. Martinez, Ithaca, NY (US); Engin Ipek, Ithaca, NY (US); Meyrem Kirman, Ithaca, NY (US); Nevin Kirman, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 88 days.

(21) Appl. No.: 11/556,454

(22) Filed: Nov. 3, 2006

(65) Prior Publication Data

US 2008/0109637 A1 May 8, 2008

(51) Int. Cl.
G06F 15/76 (2006.01)
(52) U.S. Cl. .................... 712/15; 712/205; 712/29
(58) Field of Classification Search .......... 712/15, 712/29, 205
See application file for complete search history.

(56) References Cited

U.S. PATENT DOCUMENTS

| 5,471,592 A * | 11/1995 | Gove et al. ............. 709/213 |
| 5,475,856 A * | 12/1995 | Kogge .................... 712/20 |
| 5,522,083 A | 5/1996 | Gove et al. |
| 5,638,533 A * | 6/1997 | Law ........................ 711/157 |
| 5,664,214 A * | 9/1997 | Taylor et al. ............. 712/20 |
| 5,922,066 A * | 7/1999 | Cho et al. ................ 712/204 |
| 6,018,796 A * | 1/2000 | Suzuki et al. ............ 712/42 |
| 6,725,354 B1 * | 4/2004 | Kahle et al. .............. 712/34 |
| 6,920,545 B2 | 7/2005 | Farwell et al. |
| 6,940,512 B2 * | 9/2005 | Yamaguchi et al. ..... 345/505 |
| 6,976,131 B2 | 12/2005 | Pentkovski et al. |
| 7,185,178 B1 * | 2/2007 | Barreh et al. ............ 712/206 |
| 7,240,160 B1 * | 7/2007 | Hetherington et al. ... 711/122 |
| 2003/0145189 A1 * | 7/2003 | Cremonesi et al. ....... 712/43 |
| 2003/0149862 A1 * | 8/2003 | Kadambi .................. 712/217 |
| 2003/0177288 A1 * | 9/2003 | Kunimatsu et al. ....... 710/1 |
| 2003/0200419 A1 * | 10/2003 | Ma et al. .................. 712/202 |
| 2004/0022094 A1 * | 2/2004 | Radhakrishnan et al. .. 365/200 |
| 2005/0044319 A1 * | 2/2005 | Olukotun ................. 711/118 |
| 2005/0219253 A1 * | 10/2005 | Piazza et al. ............. 345/557 |
| 2005/0289286 A1 * | 12/2005 | Ohwada ................... 711/1 |
| 2006/0004988 A1 * | 1/2006 | Jordan ..................... 712/43 |
| 2006/0075192 A1 * | 4/2006 | Golden et al. ............ 711/118 |
| 2006/0248318 A1 * | 11/2006 | Zohner et al. ............ 712/225 |
| 2006/0294326 A1 * | 12/2006 | Jacobson et al. ......... 711/156 |
| 2007/0006213 A1 * | 1/2007 | Shahidzadeh et al. ..... 717/171 |

OTHER PUBLICATIONS

Engin Ipek, Meyrem Kirman, Nevin Kirman, Jose F. Martinez, Core fusion: accommodating software diversity in chip multiprocessors, Proceedings of the 34th annual international symposium on Computer architecture, Jun. 9-13, 2007, San Diego, California, USA.*

(Continued)

Primary Examiner—Eddie P Chan
Assistant Examiner—Idriss N Alrobaye
(74) Attorney, Agent, or Firm—Burns & Levinson LLP; Jacob N. Erlich; Orlando Lopez

(57) ABSTRACT

A reconfigurable multiprocessor system including a number of processing units and components enabling executing sequential code collectively at processing units and enabling changing the architectural configuration of the processing units.

16 Claims, 3 Drawing Sheets

OTHER PUBLICATIONS

K. Mai et al. Smart Memories: a modular reconfigurable architecture. Intl. Symp. On Computer Architecture, Vancouver, Canada, Jun. 2000, pp. 161-171.

Katherine Leigh Compton, Architecture Generation of Customized Reconfigurable Hardware, Ph. D. Thesis, Northwestern University, Dec. 2003.

R. E. Kessler, The Alpha 21264 microprocessor, IEEE Micro, Mar. 1999, 9(2):24-36.

S. Palacharla et al., Complexity-effective superscalar processors, Intl. Symp. on Computer Architecture, pp. 206-218, Denver, CO, Jun. 1997.

R. Balasubramonian et al., Dynamically managing the communication-parallelism trade-off in future clustered processors, Intl Symp on Computer Architecture, Jun. 2003, 275-287.

M. Bekerman et al., Correlated load-address predictors, Intl Symp. on Computer Architecture, Atlanta, GA, May 1999, pp. 54-63.

G. Chrysos et al. Memory dependence prediction using store sets. Intl. Symp. on Computer Architecture, Barcelona, Spain, Jun.-Jul. 1998, pp. 142-153.

Laufer, R. et al., PCI-PipeRench and the SWORDAPI: a system for stream-based reconfigurable computing, 7th Annual IEEE Symp on Field-Prog Custom Computing Machines 200-208.

K. Sankaralingam et al. Exploiting ILP, TLP, and DLP with the polymorphous TRIPS architecture. In Intl. Symp. on Computer Architecture, pp. 422-433, San Diego, CA, Jun. 2003.

Changkyu Kim et al. Elastic Threads on Composable Processors, Technical Report TR-2006-09, The University of Texas at Austin, Mar. 8, 2006.

* cited by examiner

SYSTEMS AND METHODS FOR RECONFIGURING ON-CHIP MULTIPROCESSORS

BACKGROUND

Improving the performance of computer or other processing systems generally improves overall throughput and/or provides a better user experience. One technique of improving the overall quantity of instructions processed in a system is to increase the number of processors in the system. Implementing multiprocessing (MP) systems, however, typically requires more than merely interconnecting processors in parallel. For example, tasks or programs may need to be divided so they can execute across parallel processing resources, memory consistency systems may be needed, etc.

As logic elements continue to shrink due to advances in fabrication technology, integrating multiple processors into a single component becomes more practical, and in fact a number of current designs implement multiple processors on a single component or chip.

Chip multiprocessors (CMPs) hold the prospect of delivering long-term performance scalability while dramatically reducing design complexity compared to monolithic wide-issue processors. Complexity is reduced by designing and verifying a single, relatively simple core, and then replicating it. Performance is scaled by integrating larger numbers of cores on the die and harnessing increasing levels of thread level parallelism (TLP) with each new technology generation.

Unfortunately, high-performance parallel programming constitutes a tedious, time-consuming, and error-prone effort.

In that respect, the complexity shift from hardware to software in ordinary CMPs is one of the most serious hurdles to their success. In the short term, on-chip integration of a modest number of relatively powerful (and relatively complex, cores may yield high utilization when running multiple sequential workloads, temporarily avoiding the complexity of parallelization. However, although sequential codes are likely to remain important, they alone are not sufficient to sustain long-term performance scalability. Consequently, harnessing the full potential of CMPs in the long term makes the adoption of parallel programming very attractive.

To amortize the cost of parallelization, many programmers choose to parallelize their applications incrementally. Typically, the most promising loops/regions in a sequential execution of the program are identified through profiling. A subset of these regions are then parallelized, and the rest of the application is left as "future work." Over time, more effort is spent on portions of the remaining code. We call these evolving workloads. As a result of this "pay-as-you-go" approach, the complexity (and cost) associated with software parallelization is amortized over a greater time span. In fact, some of the most common shared-memory programming models in use today (for example, OpenMP) are designed to facilitate the incremental parallelization of sequential codes. We envision a diverse landscape of software in different stages of parallelization, from purely sequential, to fully parallel, to everything in between. As a result, it will remain important to efficiently support sequential as well as parallel code, whether standalone or as regions within the same application at run time. This requires a level of flexibility that is hard to attain in ordinary CMPs.

Asymmetric chip multiprocessors (ACMPs) attempt to address this by providing cores with varying degrees of sophistication and computational capabilities. The number and the complexity of cores are fixed at design time. The hope is to match the demands of a variety of sequential and parallel workloads by executing them on an appropriate subset of these cores. Recently, the impact of performance asymmetry on explicitly parallelized applications has been studied, finding that asymmetry hurts parallel application scalability and renders the applications' performance less predictable unless relatively sophisticated software changes are introduced. Hence, while ACMPs may deliver increased performance on sequential codes, they may do so at the expense of parallel performance, requiring a high level of software sophistication to maximize their potential.

Instead of trying to find the right design trade-off between complex and simple cores (as ACMPs do), there is a need for a CMP that provides the flexibility to dynamically synthesize the right mix of simple and complex cores based on application requirements.

BRIEF SUMMARY

In one embodiment, the reconfigurable multiprocessor system of these teachings comprises a number of processor units, and one or more cross unit connection components operatively connecting at least two processor units and capable of reconfigurably linking one processor unit to another processor unit, thereby enabling collective fetching and providing instructions to be executed collectively by the processor units and collectively committing instructions executed by the processor units.

Other embodiments including different cross unit connection components are also disclosed.

Embodiments of the method of using the reconfigurable multiprocessor system of these teachings are also disclosed.

For a better understanding of the present teachings, together with other and further needs thereof, reference is made to the accompanying drawings and detailed description and its scope will be pointed out in the appended claims.

DETAILED DESCRIPTION

In one embodiment, the reconfigurable multiprocessor system of these teachings comprises a number of processor units, and one or more cross unit connection components operatively connecting at least two processor units and capable of reconfigurably linking one processor unit to another processor unit, thereby enabling collective fetching and providing instructions to be executed collectively by the processor units and collectively committing instructions executed by the processor units.

In another embodiment, the method of these teachings for, in a number of processing units, making adjustments for manner of processing, parallel or sequential, includes reconfiguring cross connection between processing units upon change of manner of processing, updating instruction characteristics upon change of manner of processing and reconfiguring instruction cache memories in each processing unit upon change of manner of processing.

In a further embodiment, the method of these teachings for enabling executing code collectively at a number of processing units includes reconfigurably linking one processor unit to another processor unit and fetching and providing instructions to be executed collectively by the processor units.

An exemplary embodiment is presented hereinbelow in order to better illustrate the systems and methods of these teachings. It should be noted, however, that the systems and methods of these teachings are not limited to the exemplary embodiment presented hereinbelow.

Figure 1A:
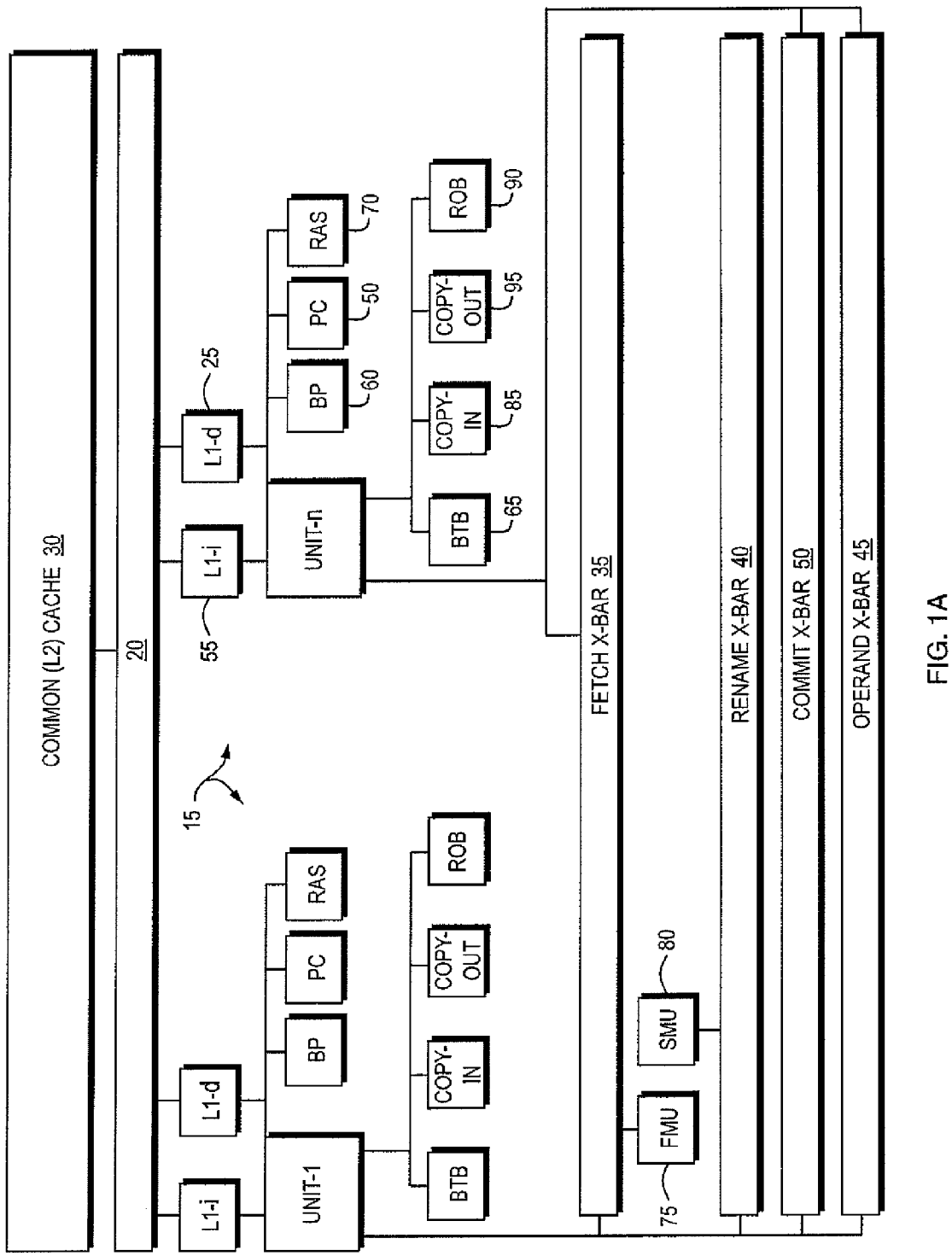
FIG. 1a is a schematic block diagram of an embodiment of the system of this invention.
Figure 1B:
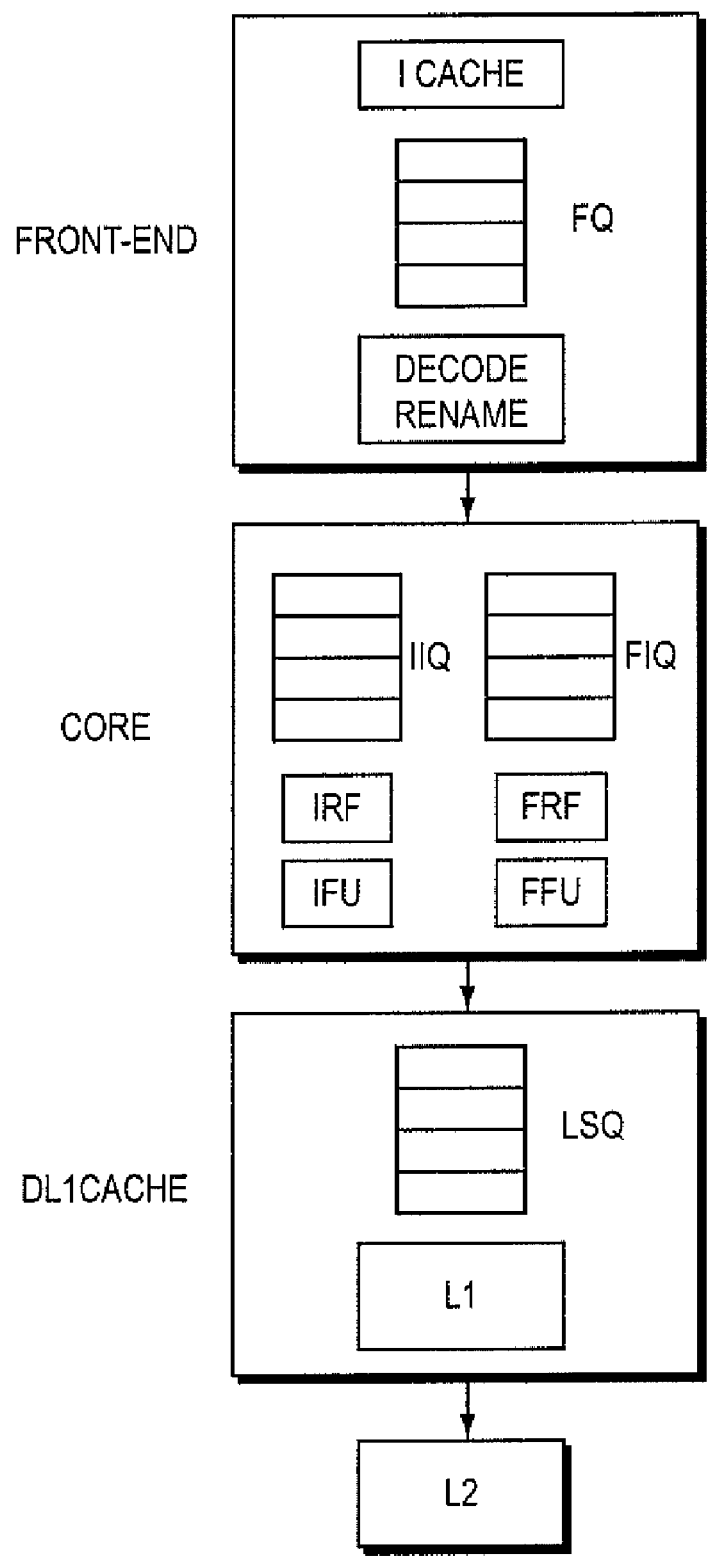
FIG. 1b is a graphical schematic block diagram of a conventional unit of a chip multi-processor.

The exemplary embodiment presented hereinbelow start from a CMP substrate with a homogeneous set of small cores. The embodiment maximizes the core count to exploit high levels of thread level parallelism (TLP), and has the modularity advantages of fine-grain CMPs. FIG. 1a shows a graphical schematic block diagram of the exemplary embodiment. In one instance, the chip consists of eight two-issue, out-of-order cores 15. A system bus 20 connects the L1 data caches 25 and enables snoop-based cache coherence. Beyond the system bus, the chip contains a shared L2 cache 30 and an integrated memory controller (not shown). The figure does not represent an actual floorplan, but rather a conceptual one. For reference and to aid with the disclosure of the exemplary embodiment herein below, a graphical schematic block diagram of a conventional single core is shown in FIG. 1b.

The exemplary embodiment delivers substantially high performance on sequential codes by empowering basic CMP cores with the ability to collaboratively exploit high levels of instruction level parallelism (ILP). This is made possible primarily by employing fetch 35, rename 40, operand 45, and commit 50 cross-core wiring (FIG. 1a), which are hereinafter referred to as crossbars. Fetch and rename crossbars coordinate the operation of the distributed front-end, while operand and commit crossbars are responsible for data communication and distributed commit, respectively. Because these wires link nearby cores together, they require a few clock cycles to transmit data between any two cores.

The connections of the crossbars to the cores can be rendered reconfigurable by conventional techniques. In one instance, the reconfigurable crossbars are implemented as a packet based dynamically routed connection as described in K. Mai, T. Paaske, N. Jayasena, R. Ho, W J. Dally, and M. Horowitz. Smart Memories: a modular reconfigurable architecture. Intl. Symp. On Computer Architecture, Vancouver, Canada, June 2000, pages 161-171, which is incorporated by reference herein. (It should be noted that these teachings are not limited to only the previously mentioned implementation of the reconfigurable crossbar connection. For other techniques see, for example, Katherine Leigh Compton, Architecture Generation of Customized Reconfigurable Hardware, Ph. D. Thesis, NORTHWESTERN UNIVERSITY, December 2003, which is incorporated by reference herein.)

The architecture of the exemplary embodiment, in one instance, can fuse groups of two or four cores, making it possible to provide the equivalent of eight two-issue four four-issue, or two eight-issue processor configurations. Asymmetric fusion is also possible, e.g., one eight-issue fused CPU and four more two-issue cores. This flexibility allows the system of these teachings to accommodate workloads of a widely diverse nature, including workloads with multiple parallel or sequential applications.

In the instance disclosed below, the fusion mechanism involving four basic cores is described. A RISC ISA, where every instruction can be encoded in one word, is utilized in the exemplary embodiment. In embodiments where CISC-like ISAs are used, predecoding/translation support is utilized.

Due to their fundamentally independent nature, each core in the exemplary embodiment is naturally equipped with its own program counter (PC) (50, FIG. 1a), instruction cache (55, FIG. 1a), branch predictor (60, FIG. 1a), branch target buffer (BTB) (65, FIG. 1a), and return address stack (RAS) (70, FIG. 1a). A small control unit called the fetch management unit (FMU) (75, FIG. 1a) is attached to the fetch crossbar. The crossbar latency, in this exemplary embodiment, is two cycles. When cores are fused, the FMU coordinates the distributed operation of all core fetch units.

Cores collectively fetch an eight-instruction block in one cycle by each fetching a two-instruction portion (their default fetch capacity) from their own instruction cache. Fetch is generally eight-instruction aligned, with core zero being responsible for the oldest two instructions in the fetch group, core one for the next two, and so forth. When a branch target is not fully aligned in this way, fetch still starts aligned at the appropriate core (lower-order cores skip fetch in that cycle), and it is truncated accordingly so that fully aligned fetch can resume on the next cycle.

Cache blocks, as delivered by the L2 cache 30 on an instruction (i)-cache miss, are eight words regardless of the configuration. On an i-cache miss, a full block is requested. This block is delivered to the requesting core if it is operating independently or distributed across all four cores in a fused configuration to permit collective fetch. To achieve this, i-caches 55, in this embodiment, are reconfigurable. In one instance, the i-caches 55 are rendered reconfigurable as in K. Mai, T. Paaske, N. Jayasena, R. Ho, W J. Dally, and M. Horowitz. Smart Memories: a modular reconfigurable architecture. Intl. Symp. On Computer Architecture, Vancouver, Canada, June 2000, pages 161-171. Each i-cache 55, in this exemplary embodiment, has enough tags to organize its data in two- or eight-word blocks, and each tag has enough bits to handle the worst of the two cases. When running independently, three out of every four tags are unused, and the i-cache handles block transfers in eight-word blocks. When in fused configuration, the i-cache uses all tags, covering two-word blocks.

Because fetch is collective, the i-Tranlation lookaside buffer (TLB), in this exemplary embodiment, are replicated across all cores in a fused configuration. It should be noted that this would be accomplished "naturally" as cores miss on their i-TLBs, however taking multiple i-TLB misses for a single eight-instruction block is unnecessary, since the FMU can be used to refill all i-TLBs upon a first i-TLB miss by a core. Finally, the FMU can also be used to gang-invalidate an i-TLB entry, or gang-flush all i-TLBs as needed.

During collective fetch, each core accesses its own branch predictor (60, FIG. 1a) and BTB (65, FIG. 1a). Because collective fetch is always aligned, dynamic instances of the same static branch instruction are guaranteed to access the same branch predictor and BTB. Consequently, the effective branch predictor and BTB capacity is four times as large. This is a desirable feature since the penalty of branch misprediction is bound to be higher with the more aggressive fetch/issue width and the higher number of in-flight instructions in the fused configuration.

Each core can handle up to one branch prediction per cycle. The redirection of the (distributed) PC upon taken branches and branch mispredictions is enabled by the FMU. Each cycle, every core that predicts a taken branch, as well as every core that detects a branch misprediction, sends the new target PC to the FMU. The FMU selects the correct PC by giving priority to the oldest misprediction-redirect PC first, and the youngest branch-prediction PC last, and sends the selected PC to all fetch units. Once the transfer of the new PC is complete, cores use it to fetch from their own i-cache as disclosed hereinabove.

On a misprediction, misspeculated instructions are squashed in all cores. This is also the case for instructions fetched along the not-taken path on a taken branch, since, in this exemplary embodiment, the target PC will arrive with a delay of two cycles.

The FMU can also provide the ability to keep global history across all four cores if needed for accurate branch prediction. To accomplish this, the Global History register (GHR) can be simply replicated across all cores, and updates be coordinate through the FMU. Specifically, in this exemplary embodiment, upon every branch prediction, each core communicates its prediction—whether taken or not taken—to the EMU. Two bits, in this exemplary embodiment, suffice to accomplish this. Additionally, as discussed hereinabove, the FMU receives nonspeculative updates from every back-end upon branch mispredictions. The FMU communicates such events to each core, which in turn update their OHR. Upon nonspeculative updates, earlier (checkpointed) OHR contents are recovered on each core. The fix-up mechanism employed to checkpoint and recover GHR contents can, in one embodiment, be along the lines of the outstanding branch queue (OBQ) mechanism in the Alpha 21264 microprocessor, as described in R. E. Kessler, The Alpha 21264 microprocessor, IEEE Micro, March 1999, 9(2):24-36, which is incorporated by reference herein.

As the target PC of a subroutine call is sent to all cores by the FMU (which flags the fact that it is a subroutine call), core zero pushes the return address into its RAS (70, FIG. 1a). When a return instruction is encountered (possibly by a different core from the one that fetched the subroutine call) and communicated to the FMU, core zero pops its PAS and communicates the return address back through the FMU. Notice that, since all RAS operations are processed by core zero, the effective RAS size does not increase when cores are fused.

When one fetch engine stalls as a result of an i-cache or i-TLB miss, or there is contention on a fetch engine for branch predictor ports (two consecutive branches fetched by the same core in the same cycle), it is necessary for all fetch engines to stall, so that correct ordering of the instructions in one fetch block can be maintained (e.g., for orderly FMU resolution of branch targets), and to allow instructions in the same fetch group to flow through later stages of the fused front-end (most notably, through rename) in a lock-step fashion. To support this, cores communicate fetch stalls to the FMU, which informs the other cores. In one instance of the exemplary embodiment, because of the two-cycle crossbar latency, it is possible that the other cores may over-fetch in the shadow of the stall handling by the FMU if (a) on an i-cache or i-TLB miss, one of the other cores does hit in its i-cache or i-TLB (very unlikely in practice, given how fused cores fetch), or (b) generally in the case of contention for branch predictor ports by two back-to-back branches fetched by the same core (itself exceedingly unlikely). Once all cores have been informed, including the delinquent core, the cores discard any over-fetched instruction (similarly to the handling of a taken branch) and resume fetching in sync from the right PC-as if all fetch engines had synchronized through a "fetch barrier."

After fetch, each core pre-decodes its instructions independently. Subsequently, all instructions in the fetch group need to be renamed. Steering consumers (of instructions) to the same core as their producers can improve performance by eliminating communication delays. Renaming and steering of instructions is achieved through a small control unit called the steering management unit (SMU) (80, FIG. 1a). The SMU consists of a global steering table to track the mapping of architectural registers to any core, four free-lists, in one instance of the exemplary embodiment, for register allocation (one for each core), four rename maps, in one instance of the exemplary embodiment, and steering/renaming logic (See FIG. 2). The steering table and the four rename maps together allow up to four valid mappings of each architectural register, and enable operands to be replicated across multiple cores. Cores still retain their individual renaming structures, but these are bypassed when cores are fused.

Figures 2, 3:
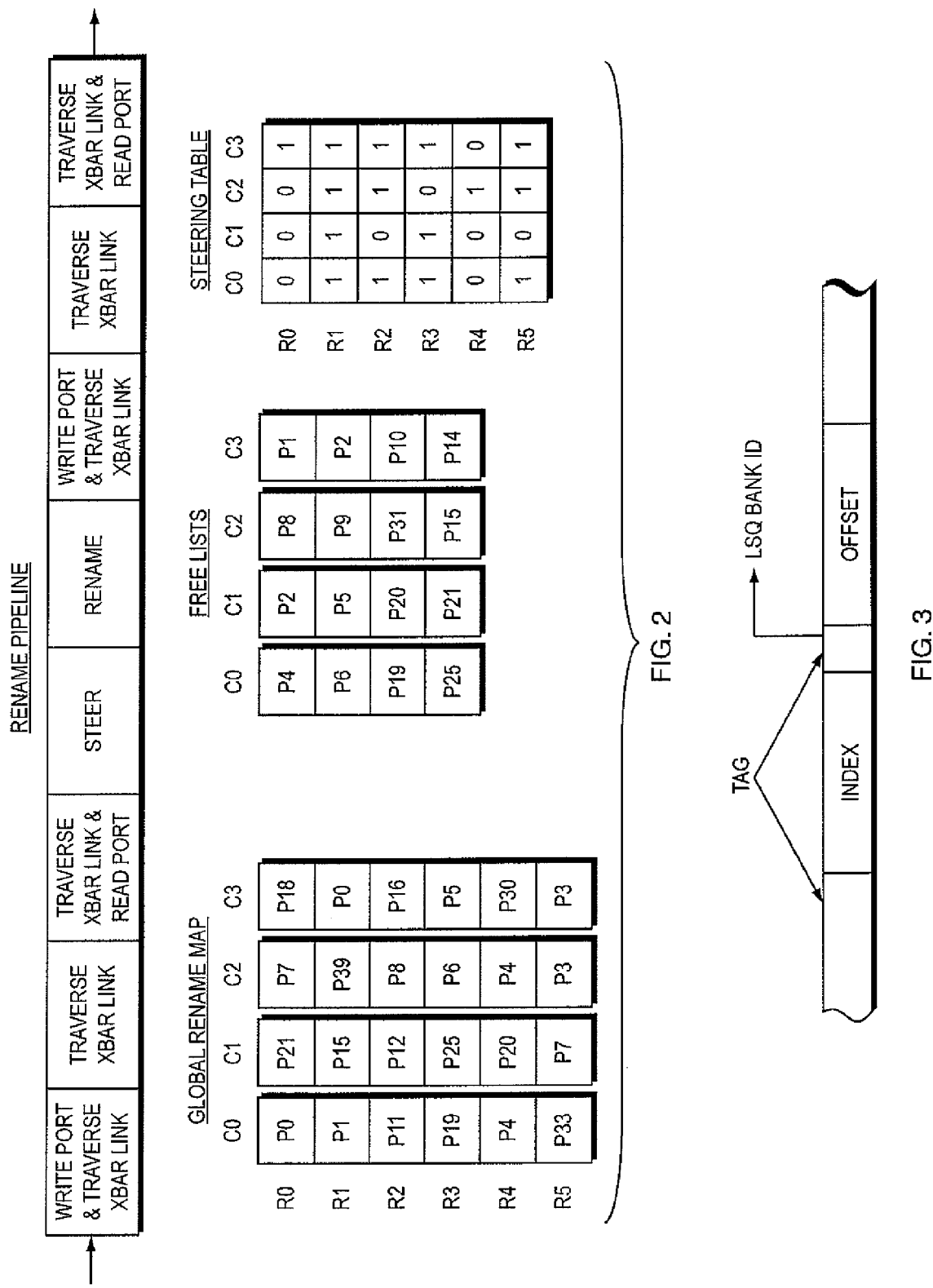
FIG. 2 is a graphical schematic diagram of a component of an embodiment of the system of this invention.
FIG. 3 represents a graphical schematic diagram of a knowledge component of an embodiment of the system of this invention.

FIG. 2 depicts the high level organization of the rename pipeline. After pre-decode, each core sends up to two instructions to the SMU through a set of links. In one instance, it is possible to support three-cycle cross-core communication over a repeated link. In one instance of the exemplary embodiment, three cycles after pre-decode, the SMU receives up to two instructions and six architectural register specifiers (three per instruction) from each core. After renaming and steering, it uses a second set of links to dispatch up to six physical register specifiers, two instructions and two copy operations to each core. Restricting the SMU dispatch bandwidth in this way keeps the wiring overhead manageable, lowers the number of required rename map ports, and also helps achieve load balancing among the fused cores, Collectively, the incoming and outgoing SMU links constitute the rename crossbar.

The SMU uses the incoming architectural register specifiers and the four free lists, in one instance of the exemplary embodiment, to rename up to eight instructions every pipeline cycle. Each instruction is dispatched to one of the cores via dependence based steering (for dependence based steering, see for example, S. Palacharla, N. P. Jouppi, and I. E. Smith, *Complexity-effective superscalar processors*, Intl. Symp. on Computer Architecture, pages 206-218, Denver, Colo., June 1997, which is incorporated by reference herein). For each instruction, the SMU consults the steering table to steer every instruction to the core that will produce most of its operands among all cores with free rename crossbar ports. Copy instructions are also inserted into the fetch group in this cycle. In the next cycle, instructions (and the generated copies) are renamed by accessing the appropriate rename map and free list.

Since each core receives no more than two instructions and two copy instructions, each rename map has only six read and eight write ports. The steering table requires eight read and sixteen write ports; note that each steering table entry contains only a single bit, and thus the overhead of multi-porting this small table is relatively low. After rename, regular and copy instructions are dispatched to the appropriate cores. If a copy instruction cannot be sent due to bandwidth restrictions, renaming stops at the offending instruction that cycle, and starts with the same instruction next cycle, thereby draining crossbar links and guaranteeing forward progress. Similarly, if resource occupancies prevent the SMU from dispatching an instruction, renaming stops that cycle, and resumes when resources are available. To facilitate this, cores inform the SMU through a four-bit interface, in one instance of the exemplary embodiment, when their issue queues, reorder buffers (ROBs), and load/store queues are full.

Registers are recycled through two mechanisms. As in many existing microprocessors, at commit time, any instruction that renames an architectural register releases the physical register holding the result of the previous instruction that renamed the same register. This is accomplished in core fusion over a portion of the rename crossbar, by having each ROB send the specifiers for these registers to the SMU. However, copy instructions do not allocate ROB entries, and recycling them requires an alternative strategy. Every copy instruction generates a replica of a physical register in one core on some other core. These replicas are not recovered on branch mispredictions. Therefore, a register holding a redundant replica can be recycled at any point in time as long as all instructions whose architectural source registers are mapped to that physical register have read its value. To facilitate recycling, the SMU keeps a one-bit flag, in one instance, for each register indicating whether the corresponding register is currently holding a redundant replica (i.e., it was the target of a copy instruction). In addition, the SMU keeps a table of per-register read counters for each core, where every counter entry corresponds to the number of outstanding reads to a specific physical register (in one instance, each counter is four bits in a sixteen-entry issue queue). These counters are incremented at the time the SMU dispatches instructions to cores. Every time an instruction leaves a core's issue queue, the core communicates the specifiers for the physical registers read by the instruction, and the SMU decrements the corresponding counters. When a branch misprediction or a replay trap is encountered, as squashed instructions are removed from the instruction window, the counters for the corresponding physical registers are updated appropriately in the shadow of the refetch.

Each core's back-end includes separate floating-point and integer issue queues, a copy-out queue (95, FIG. 1*a*), a copy-in queue (85, FIG. 1*a*), a physical register file, functional units, load/store queues and a ROB (90, FIG. 1*a*). Each core's load/store queue has access only to its private L1 data cache (25, FIG. 1*a*). The L1 data caches are connected via a split-transaction bus and are kept coherent, in one instance, via a MESI protocol. (The name of the MESI protocol is based on four possible states of the cache blocks: Modified, Exclusive, Shared and Invalid.) This split-transaction bus is also connected to an on-chip L2 cache that is shared by all cores. When running independently on one core, the operation of the back-end is no different from the operation of a core in a homogeneous CMP. When cores get fused, back-end structures are coordinated to form a large virtual back-end capable of consuming instructions at a rate of, in one instance of the exemplary embodiment, eight instructions per cycle.

Copy instructions wait in the copy-out queues for their operands to become available, and once issued, they transfer their source operand and destination physical register specifier to a remote core over the operand crossbar (FIG. 1*a*). The operand crossbar is capable of supporting every cycle two copy instructions per core. In addition to copy instructions, loads, the operand crossbar is used to deliver values to their destination register.

When copy instructions reach the consumer core, the copy instructions are placed in a copy-in queue to wait for the selection logic to schedule them. Each cycle, the issue queue scheduler considers the two copy instructions at the queue head for scheduling along with the instructions in the issue queue. Once issued, copies wake up their dependent instructions and update the physical register file, just as regular instructions would do.

The goal of the fused in-order retirement operation is to coordinate the operation of four ROBs to commit up to eight instructions per cycle. Instructions allocate ROB entries locally at the end of fetch. If the fetch group contains less than eight instructions, NOPs (No Operation instructions) are allocated at the appropriate cores to guarantee alignment. Of course, on a pipeline bubble, no ROB entries are allocated.

When commit is not blocked, each core commits two instructions from the oldest fetch group every cycle. When one of the ROBs is blocked, all other cores must also stop committing on time to ensure that fetch blocks are committed atomically in-order. This is accomplished via the commit crossbar, which transfers stall/resume signals across all ROBs.

To accommodate the communication delay across the crossbars, each ROB is extended with a speculative head pointer in addition to the conventional head and tail pointers. Instructions always pass through the speculative ROB head before they reach the actual ROB head and commit. If not ready to commit at that time, a stall signal is sent to all cores. Later, when ready to commit (the commit component "decides" when it is safe to store a result), they move past the speculative head and send a resume signal to the other cores. The number of ROB entries between the speculative head pointer and the actual head pointer is enough to cover the crossbar delay. This guarantees that ROB stalls always take effect in a timely manner to prevent committing speculative state.

Conventional clustered architectures, having a centralized L1 data cache or a data cache distributed based on bank assignment, utilize a scheme for handling loads and stores as described in, for example, R. Balasubramonian, S. Dwarkadas, and D. H. Albonesi, *Dynamically managing the communication-parallelism trade-off in future clustered processors*, Intl. Symp. on Computer Architecture, San Diego, Calif., June 2003, pages 275-287, which is incorporated by reference herein. The exemplary embodiment of the system of these teachings utilizes a scheme for handling loads and stores conceptually similar to that of closed architectures but retaining the private nature of the L1 cache of each core, thereby requiring substantially minimal modifications of the conventional CMP cache subsystem.

In the fused mode, in the exemplary embodiment, a banked-by-address LSQ implementation is utilized. This allows keeping data coherent without requiring cache flushes after dynamic reconfiguration/and to support elegantly store forwarding and speculative loads. The core that issues each load/store to the memory system is determined based on effective addresses. The two bits, in one instance of the exemplary embodiment, that follow the block offset are used as the LSQ bank-ID to select one of the four cores (see FIG. 3), and enough index bits to cover the L1 cache are allocated from the remaining bits. The rest of the effective address and the bank-ID are stored as a tag (note that this does not increase the number of tag bits compared to a conventional indexing scheme). Making the bank-ID bits part of the tag properly disambiguates cache lines regardless of the configuration.

Effective addresses for loads and stores are generally not known at the time they are renamed. At rename time memory operations need to allocate LSQ entries from the core that will eventually issue them to the memory system. In the exemplary embodiment, bank prediction is utilized (see, for example, M. Bekerman, S. Jourdan, R. Ronen, G. Kirshenboim, L. Rappoport, A. Yoaz, and U. Weiser, *Correlated load-address predictors*, Intl Symp. on Computer Architecture, Atlanta, Ga., May 1999, pages 54-63, which is incorporated by reference herein). Upon pre-decoding loads and stores, each core accesses its bank predictor by using the lower bits of the load/store PC. Bank predictions are sent to the SMU through the rename crossbar, and the SMU steers each load and store to the predicted core. Each core allocates load queue entries for the loads it receives. On stores, the SMU also signals all cores to allocate dummy store queue entries regardless of the bank prediction. Dummy store queue entries guarantee in-order commit for store instructions by reserving place-holders across all banks for store bank mispredictions. Upon effective address calculation, remote cores with superfluous store queue dummies are signaled to discard their entries (recycling these entries requires a collapsing LSQ implementation). If a bank misprediction is detected, the store is sent to the correct queue.

In the case of loads, if a bank misprediction is detected, the load queue entry is recycled (LSQ collapse) and the load is sent to the correct core. There, it allocates a load queue entry and resolves its memory dependences locally. Note that, as a consequence of bank mispredictions, loads can allocate entries in the load queues out of program order. Fortunately, this is not a problem for store-to-load forwarding because load queue entries are typically tagged by instruction age to facilitate forwarding. However, there is a danger of deadlock in cases where the mispredicted load is older than all other loads in its (correct) bank and the load queue is full at the time the load arrives at the consumer core. To prevent this situation, loads search the load queue for older instructions when they cannot allocate entries. If no such entry is found, a replay trap is taken, and the load is steered to the right core at rename time. Otherwise, the load is buffered until a free load queue entry becomes available. Address banking of the LSQ also facilitates speculative loads and store forwarding.

Since any load instruction is free of bank mispredictions at the time it issues to the memory system, loads and stores to the same address are guaranteed to be processed by the same core. Dependence speculation can be achieved by integrating a storeset predictor (as detailed, for example, in G. Chrysos and J. Emer. Memory dependence prediction using store sets. Intl. Symp. on Computer Architecture, Barcelona, Spain, June-July 1998, pages 142-153, which is incorporated by reference herein) on each core (since cores perform aligned fetches, the same load is guaranteed to access the same predictor at all times).

When running parallel application threads in fused mode, the memory consistency model should be enforced on all loads and stores. In one embodiment, relaxed consistency models are utilized where special primitives like memory fences (weak consistency) or acquire/release operations (release consistency) enforce ordering constraints on ordinary memory operations. The operation of memory fences is presented hereinbelow. Acquire and release operations are handled similarly.

For the correct functioning of synchronization primitives, fences (memory fence instructions) must be made visible to all load/store queues belonging to the same thread. In this instance of the exemplary embodiment, these operations are dispatched to all the queues, but only the copy in the correct queue performs the actual synchronization operation. The fence is considered complete once each one of the local fences completes locally and all memory operations preceding each fence commit. Local fence completion is signaled to all cores through a one-bit interface in the portion of the operand crossbar that connects the load-store queues.

The embodiment presented hereinabove disclose the operation of the cores in a static fashion. While the embodiments disclosed hereinabove are capable of improving performance on highly parallel or purely sequential applications, by configuring the CMP prior to executing the application, partially parallelized applications will benefit most from the ability to fuse/split cores at run time, as they dynamically switch between sequential and parallel code regions, respectively. In order to support dynamic reconfiguration of the architecture of these teachings, the embodiment of the method of these teachings include several actions to be taken to ensure correctness upon core fusion and fission, and embodiments of this system of these teachings include an application interface to coordinate and trigger reconfiguration. (For an example of an application interface, these teachings not limited by this example, using a higher level language, see, Laufer, R.; Taylor, R. R.; Schmit, H., *PCI-PipeRench and the SWORDAPI: a system for stream-based reconfigurable computing*, Seventh Annual IEEE Symposium on Field-Programmable Custom Computing Machines, 1999, FCCM '99. Proceedings, Date: 1999, Pages: 200-208, which is incorporated by reference herein.)

The modular nature of the architecture of these teachings makes reconfiguration relatively easy. In one embodiment, run-time reconfiguration is enabled through a simple application interface. The application requests core fusion/fission actions through system calls. In many embodiments, the requests can be readily encapsulated in conventional parallelizing macros or directives.

After the completion of a parallel region, the application may, in one instance, request cores to be fused to execute the upcoming sequential region. Cores need not get fused on every parallel-to-sequential region boundary: if the sequential region is not long enough to amortize the cost of fusion, execution can continue without reconfiguration on one of the small cores. All in-flight instructions following the system call are flushed, and the appropriate rename map on the SMU is updated with mappings to the architectural state on this core. Data caches do not need any special actions to be taken upon reconfigurations; the coherence protocol naturally ensures correctness across configuration changes. I-caches undergo tag reconfiguration upon fusion and fission as described hereinabove, and all cache blocks are invalidated for consistency. This is generally harmless if it can be amortized over the duration of a configuration. In any case, the programmer or the run-time system may choose not to reconfigure across fast-alternating program regions (e.g., short serial sections in between parallel sections). The shared L2 cache is not affected by reconfiguration.

In one embodiment, fission is achieved through a second system call, where the application informs the processor about the approaching parallel region. Fetch is stalled, in-flight instructions are allowed to drain, and enough copy instructions are generated to gather the architectural state into core zero's physical register file. When the transfer is complete, control is returned to the application.

Results on the performance of the exemplary embodiment described hereinabove are reported in Engin pek, M. K rman, N. K rman, and J. F. Martinez. Accommodating workload diversity in chip multiprocessors via adaptive core fusion, Workshop on Complexity-effective Design, conc. with ISCA, Boston, Mass., June 2006, which is incorporated by reference herein.

While these teachings have been illustrated by the exemplary embodiment disclosed herein above, it should be noted that these teachings are not limited only to the exemplary embodiment. Embodiments in which a cross unit connection component incorporates the functionality of several of the crossbars in the exemplary embodiment are also within the scope of these teachings. The crossbars in the exemplary embodiment and one or more cross unit connection components incorporating the functionality of the crossbars in the exemplary embodiment comprise means for enabling executing sequential code collectively at processor units and enabling changing the architectural configuration of the processing units.

Although these teachings have been described with respect to various embodiments, it should be realized this invention is also capable of a wide variety of further and other embodiments within the spirit and scope of the appended claims.

What is claimed is:

1. A reconfigurable multiprocessor system comprising:
a plurality of processor units, wherein the plurality of processor units are independent cores and dynamically fused into a single processor, wherein the single processor is dynamically split into distinct processing units at run time; and
at least one cross unit connection component operatively connecting at least two processor units from said plurality of processor units, said at least one cross unit connection component reconfigurably linking one processor unit to another processor unit, thereby fusing them as a single processor, said reconfigurable linking adjusting processing to sequential when in a fused mode and to parallel when in a split mode; said at least one cross unit connection component enabling collective fetching and providing instructions to be executed collectively by said at least two processor units and collectively committing executed instructions by said at least two processor units; said collective fetching comprising cooperatively fetching an instruction block; said instruction block comprising a number of subsets, said fetching being performed cooperatively by fetching a one subset of said instruction block by each of said at least two processor units, when the processor units are in the fused mode; said instruction block comprising each subsets of instructions fetched by each of said at least two processor units; said instruction block being constructed from each subset of instructions fetched by each of said at least two processor units; said collective fetching enabling operation of said at least two processor units substantially as a single processor unit; whereby executing sequential code collectively at processor units is enabled; and
when changing manner of processing from fused to split or from split to fused, bringing an internal state of said plurality of processing units to a form consistent with a new configuration, resulting from the reconfiguring of cross connection unit, and
reconfiguring instruction cache memories in each processing unit and updating instruction characteristic upon change of manner of processing.

2. The reconfigurable multiprocessor system of claim 1 wherein each processor unit from said plurality of processor units comprises:
a program counter;
an instruction cache memory;
a data cache memory;
a copy in queue memory;
a copy out queue memory, and
a reorder buffer memory;
and wherein said at least one connection component comprises:
a first cross unit connection component reconfigurably and operatively connecting;
said at least two processor units from said plurality of processor units and enabling reconfigurably linking one processor unit to another processor unit, and of enabling collective fetching and branch prediction;
a second cross unit connection component reconfigurably and operatively connected to said at least two processor units from said plurality of processor units, said second cross unit connection component enabling steering and renaming instructions for/from each processor unit;
a third cross unit connection component reconfigurably and operatively connecting said at least two processor units from said plurality of processor units and enabling transfer of output instruction values from one processor unit as input instruction values to another processor unit;
a fourth cross unit connection component reconfigurably and operatively connecting at least two processor units from said plurality of processor units, said fourth cross unit connection component enabling transferring signals between reorder buffer memories in processor units from said plurality of processor units, and of enabling collective instruction commit.

3. The reconfigurable multiprocessor system of claim 2 further comprising:
a fetch management component operatively connected to said first cross unit connection component, said fetch management component enabling coordinating distributed operation of fetch components in each processor unit.

4. The reconfigurable multiprocessor system of claim 2 further comprising:
a steering management component enabling steering and renaming instructions for/from each processor unit; and said steering management component being operatively connected to each processor unit through said second cross unit connection component.

5. The reconfigurable multiprocessor system of claim 2 further comprising:
an application interface for coordinating and starting reconfiguration.

6. A method for executing code collectively at a plurality of processing units, wherein the plurality of processing units are independent cores and dynamically fused into a single processing unit, wherein the single processing unit is dynamically split into distinct processing units at run time, the method comprising the steps of:
reconfiguring cross connection between processing units in said plurality of processing units, said reconfiguring comprising:
reconfigurably linking one processor unit to another processor unit, thereby fusing them as a single processor, said reconfigurable linking adjusting processing to sequential when in a fused mode and to parallel when in a split mode;
fetching and providing instructions to be executed collectively by the plurality of processor units; said fetching comprising fetching an instruction block cooperatively by fetching a subset of said instruction block by each of at least two processor units from the plurality of processor units;
said instruction block comprising each subset of instructions fetched by each of said at least two processor units, when the processing units are in the fused mode; said instruction block being constructed from each subset of instructions fetched by each processor unit from the plurality of processor units; said fetching enabling operation of said at least two processor units as a single processing unit; and thereby enabling execution of sequential code collectively at processing units;
when changing manner of processing from fused to split or from split to fused, bringing an internal state of said plurality of processing units to a form consistent with a new configuration, resulting from the reconfiguring of cross connection; and
reconfiguring instruction cache memories in each processing unit and updating instruction characteristic upon change of manner of processing.

7. The method of claim 6 wherein the step of fetching and providing instructions comprises the steps of:
- providing a cross unit connection component having a fetch management component operatively connected thereto;
- accepting at the fetch management component, a target instruction address from at least one providing processing unit;
- selecting, at the fetch management component, contents of a program counter; and
- providing the selected contents of a program counter to a fetch component in each processor unit;
- discarding, at each processing unit, over fetched instructions; and
- resuming fetching, in synchronization with each processing unit, from contents of the selected contents of the program counter.

8. The method of claim 7 wherein the step of fetching and providing instructions further comprises the steps of:
- communicating, from processing units experiencing fetch stalls, the fetch stalls to the fetch management component;
- reporting from the fetch management component, to processing units possibly not experiencing fetch stalls, the communicated fetch stalls.

9. The method of claim 6 wherein the step of fetching and providing instructions comprises the steps of:
- providing a steerable cross unit connection component having a steering management component attached thereto;
- sending to the steering management component, from each processing unit, at most a predetermined number of instructions;
- receiving, at a predetermined number of cycles after sending, at the steering management component at most the predetermined number of instructions from each processing unit and a corresponding predetermined number of architectural register specifiers from each processing unit; renaming and steering instructions received from each processing unit; and sending, after renaming and steering, to each processing unit, from the steering management component, a predetermined number of renamed and steered instructions and copy operations.

10. The method of claim 6 further comprising the step of: accepting reconfiguration requests indicating a change in manner of processing.

11. The method of claim 6 further comprising the step of:
- transferring operands and destination register specification from one processing unit to another processing unit.

12. The method of claim 6 further comprising the step of:
- providing stall/resume signals to a Reorder buffer in each processing unit.

13. The method of claim 9 further comprising the steps of:
- generating bank predictions at each processing unit after identifying load and store instructions;
- providing the bank predictions from each processing unit to the steering management component;
- directing load and store instructions to a predicted processing unit.

14. The method of claim 9 further comprising the steps of:
- generating address predictions at each processing unit after identifying load and store instructions;
- directing load and store instructions to processing units based on said address predictions;
- redirecting load and store instructions to other processing units, if misprediction is detected.

15. The method of claim 14 wherein the directing load and store instructions is achieved by means of said steerable cross unit connection component and said steering management component.

16. The method of claim 14 wherein load and store instructions are redirected to other processing units upon effective address calculation.

* * * * *

UNITED STATES PATENT AND TRADEMARK OFFICE
CERTIFICATE OF CORRECTION

PATENT NO. : 7,809,926 B2  
APPLICATION NO. : 11/556454  
DATED : October 5, 2010  
INVENTOR(S) : Jose F. Martinez et al.

It is certified that error appears in the above-identified patent and that said Letters Patent is hereby corrected as shown below:

In column 11, lines 58-59 (claim 2), "operatively connecting; said" should read -- operatively connecting said --

Signed and Sealed this

Twenty-third Day of November, 2010

David J. Kappos  
*Director of the United States Patent and Trademark Office*